US009404228B1

(12) United States Patent
Coats et al.

(10) Patent No.: US 9,404,228 B1
(45) Date of Patent: Aug. 2, 2016

(54) ACCESSORY CONTROL SYSTEM FOR PAVING OPERATIONS MACHINE

(71) Applicant: GOMACO Corporation, Ida Grove, IA (US)

(72) Inventors: Robert E. Coats, Sac City, IA (US); Todd Hoaglund, Kiron, IA (US); Lex Jacobson, Battle Creek, IA (US); Kevin L. Klein, Denison, IA (US)

(73) Assignee: GOMACO Corporation, Ida Grove, IA (US)

( * ) Notice: Subject to any disclaimer, the term of this patent is extended or adjusted under 35 U.S.C. 154(b) by 58 days.

(21) Appl. No.: 14/308,213

(22) Filed: Jun. 18, 2014

Related U.S. Application Data

(63) Continuation of application No. 14/172,461, filed on Feb. 4, 2014, now Pat. No. 9,051,696.

(51) Int. Cl.
*E01C 19/00* (2006.01)
*E01C 19/23* (2006.01)
*E01C 19/22* (2006.01)

(52) U.S. Cl.
CPC ............... *E01C 19/23* (2013.01); *E01C 19/00* (2013.01); *E01C 19/22* (2013.01)

(58) Field of Classification Search
CPC .......... E01C 19/00; E01C 19/22; E01C 19/23
USPC .................................. 404/72, 75, 84.05–84.5
See application file for complete search history.

(56) References Cited

U.S. PATENT DOCUMENTS

| | | | | |
|---|---|---|---|---|
| 3,801,211 A | * | 4/1974 | Perkins | E01C 11/24 404/103 |
| 4,029,165 A | | 6/1977 | Miller et al. | |
| 4,360,293 A | * | 11/1982 | Wade | E02B 5/02 404/96 |
| 4,789,266 A | * | 12/1988 | Clarke, Jr. | E01C 19/187 404/104 |
| 5,318,378 A | | 6/1994 | Lent | |
| 5,941,658 A | * | 8/1999 | Dahlinger | E01C 19/008 172/4.5 |
| 6,152,648 A | * | 11/2000 | Gfroerer | E01C 23/088 299/1.5 |
| 6,582,152 B2 | * | 6/2003 | Leone | E01C 19/42 404/105 |
| 6,692,185 B2 | * | 2/2004 | Colvard | B62D 7/026 180/411 |
| 6,715,957 B2 | * | 4/2004 | Colvard | E01C 19/407 404/105 |
| 6,890,123 B2 | * | 5/2005 | Piccoli | E01C 19/4893 180/442 |

(Continued)

*Primary Examiner* — Raymond W Addie
(74) *Attorney, Agent, or Firm* — Suiter Swantz pc llo

(57) ABSTRACT

A modularly configurable paving operations system includes a modular framework extendible or reducible by the addition or removal of frame inserts. A control system can rotate one or more steerable crawlers via a steering assembly to drive, steer, or reconfigure the system. The control system may also include a tining control system, a grade control system, a spray control system, sensors and sensor arrays, and a user interface. The system may accommodate one or more accessories through an undercarriage mounted to the modular framework, which may further include position and elevation sensors and proximity switches. A height adjuster may be configured to raise or lower accessories to maintain a consistent depth or elevation for transverse or longitudinally oriented texturing.

17 Claims, 11 Drawing Sheets

(56) References Cited

U.S. PATENT DOCUMENTS

| | | | |
|---|---|---|---|
| 8,070,385 B2* | 12/2011 | Green | E01C 19/006 404/118 |
| 8,696,237 B2* | 4/2014 | Hanfland | G01B 21/08 404/118 |
| 2002/0192025 A1* | 12/2002 | Johnson | E01C 23/088 404/75 |
| 2003/0180092 A1 | 9/2003 | Piccoli | |
| 2007/0059098 A1 | 3/2007 | Mayfield et al. | |
| 2009/0311045 A1* | 12/2009 | Jurasz | E01C 23/127 404/75 |
| 2010/0021234 A1 | 1/2010 | Willis et al. | |
| 2011/0236129 A1 | 9/2011 | Guntert, Jr. et al. | |
| 2012/0321385 A1* | 12/2012 | Hanfland | G01B 21/08 404/84.1 |
| 2012/0321386 A1* | 12/2012 | Hanfland | G01B 21/08 404/118 |
| 2014/0086683 A1* | 3/2014 | Bockes | E01C 23/0933 404/84.05 |

* cited by examiner

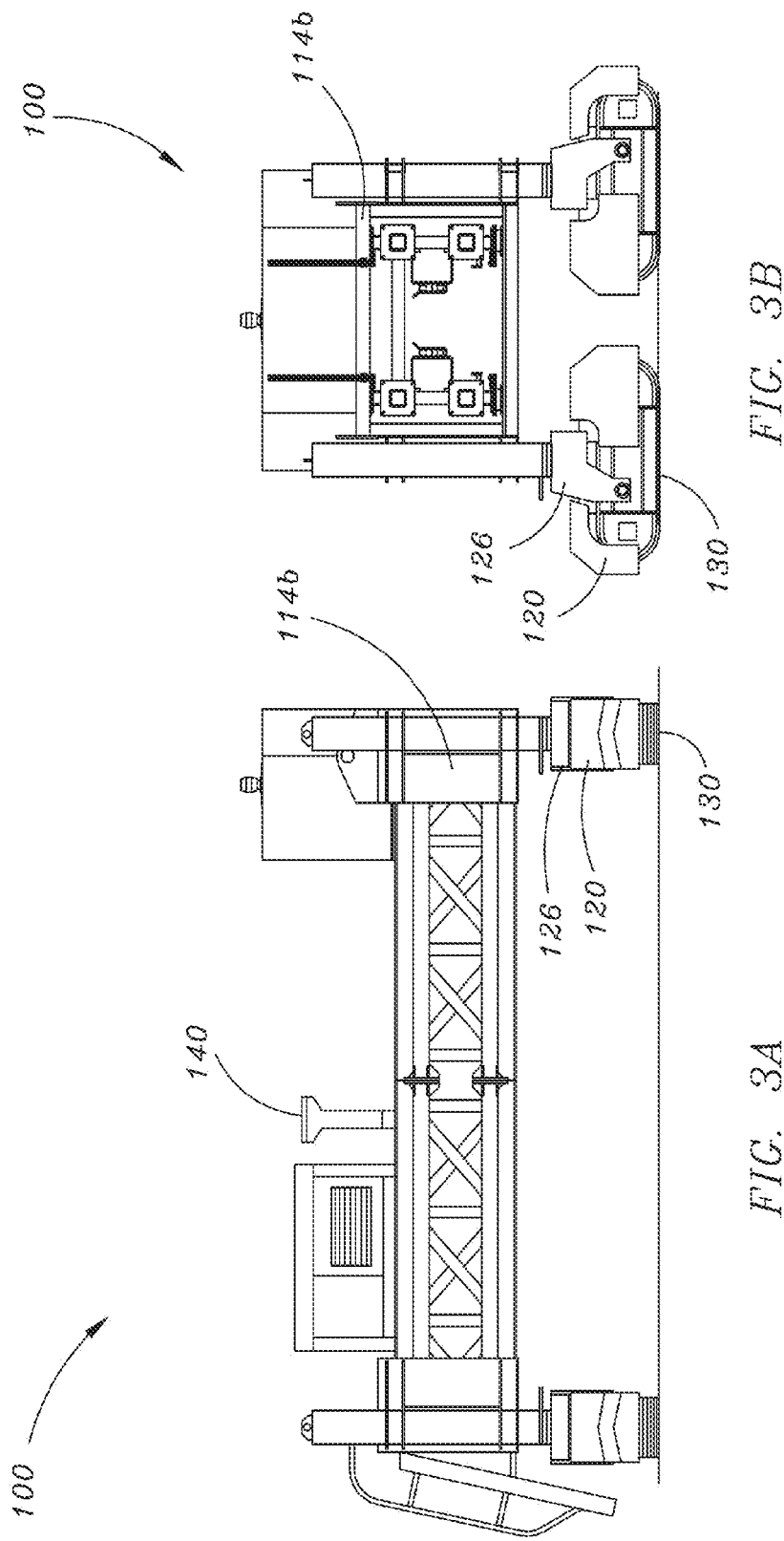

ACCESSORY CONTROL SYSTEM FOR PAVING OPERATIONS MACHINE

CROSS-REFERENCE TO RELATED APPLICATIONS

The present application is a continuation of, and claims priority under 35 U.S.C. §120 to, U.S. patent application Ser. No. 14/172,461, filed Feb. 4, 2014, entitled Modular Configurable Paving Apparatus and Modular Configurable Paving Operation System, now pending. Said U.S. Patent Application is herein incorporated by reference in its entirety.

TECHNICAL FIELD

The present invention relates generally to the field of paving operations, and more particularly to paving machines with component/assembly modularity for ease of manufacture, improved user reconfigurability, and improved transportability.

BACKGROUND

Paving machines (such as texture/cure machines or like paving operations systems) are typically 2-track or 4-track (incorporating single-track or double-track end cars respectively), single-beam or multiple-beam, a first width or a second width, a first length or a second length, or a single tool, dual tool, or multi-tool (accessory). Two-track machines skid steer with the potential for variance in the perpendicularity of the machine to the slab, causing distortions to the parallelism of the grooves to the slab's edge. 4-track steerable machines negate this shortcoming with increased complexity.

Paving depth, surface preparation, transitions (slope and slab) and the like have traditionally been controlled by grade control with or without a hinge mechanism (crown transitions). Transition Adjustment (TA) sections add much in the way of cost and complexity to the frame. Groove depth error is subject to error in the control of crown angle in both the paver and the texture machines.

Paving equipment, including most paving machine frameworks and components, are generally designed and constructed to accommodate varying surface widths and/or tools/accessories. This is done through combinations of fixed-width modular structures and telescoping modular structures. A fixed structural support or bolster is fitted to the end of the machine framework by joining it to the grade control legs. End cars or other end structures must be detached to add or remove fixed-width frame members, and telescoping structures used for width changes add cost and complexity.

SUMMARY

Embodiments of the present invention are directed to a paving operations system having a modular framework that incorporates a rail system to facilitate mounting of accessories/components and support of the framework by an end structure, or end car, at either end of the framework. This allows for repositioning an end structure relative to the modular framework and adjusting the operating width of the system without the complexity of a telescoping frame member. The end structure and accessories may be moved along the framework by lateral sliding action along the rail system. Additional modular frame members may be added to or removed from the main framework's outside end without removal of end structure, which is simply moved along the framework to its new position.

Preferred embodiments of the paving operations system incorporate a steering assembly at each end structure configured to convert the system between an operational/paving configuration and a transitional configuration. The steering assembly can utilize sensor-equipped steering cylinders to rotate steerable crawlers mounted to the end structures individually or in unison. Through a control system, the steering assembly can direct the position of the system and make precise steering corrections. The steering assembly can also position the steerable crawlers on one side of the system for lateral movement of an end structure along the modular framework to a new position.

In preferred embodiments, the modular framework of the system may be fitted with or connected to a range of accessories such as materials pans, spreader plows, longitudinal and transverse texture rakes, dowel bar inserters, burlap drags, pavement cure distributors, finishing screeds, or surface trimming systems. A paving operations system thus assembled from a selection of modular components and accessories can accommodate a diverse range of functionalities through a single base apparatus. For example, embodiments of the system may include an undercarriage fitted with pan and spreader accessories for paving a surface. Undercarriage accessories can then be swapped out for texturing accessories connected to the control system for precise tining and crowning, and later swapped out again for pavement curing accessories. In embodiments, the system incorporates sonic slab tracking and closed loop control of the grooving rake's position in addition to the machine's grade control to govern tining depth both for longitudinal and transverse grooves through any crown variance. Such a configuration preferably permits precise control without the added complexity of hinge mechanisms for crowning.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The advantages of the invention may be better understood by those skilled in the art by reference to the accompanying figures in which:

FIG. 3A is a front elevational view of an embodiment of the paving operations system in an operational/paving configuration;

FIG. 3B is an end elevational view of an embodiment of the paving operations system in an operational/paving configuration illustrating means for attaching an additional frame insert to a walking end car;

DETAILED DESCRIPTION

Features of the present invention in its various embodiments are exemplified by the following descriptions with reference to the accompanying drawings, which describe the present invention with further detail. These drawings depict only selected embodiments of the present invention, and should not be considered to limit its scope in any way.

Figure 1:
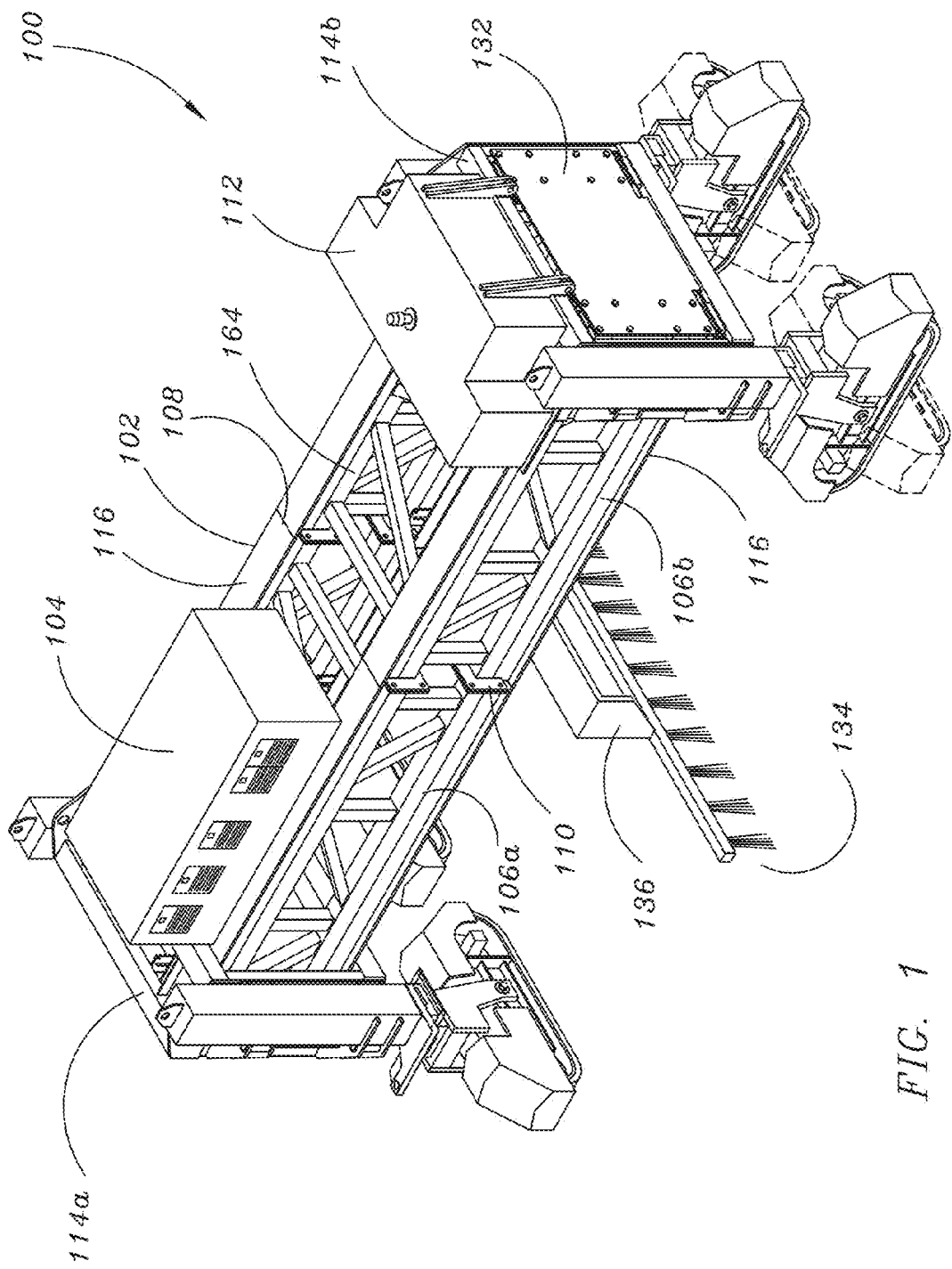
FIG. 1 is a perspective view of a four-track paving operations system having a readily extendable transverse width adjustment according to an embodiment of the present invention.

FIG. 1 depicts an embodiment of a paving operations system 100 of the present invention. System 100 includes a modular framework 102 supported at either end by drive end car 114a and walking end car 114b. Modular framework 102 includes individual frame members 106a and 106b. In preferred embodiments, modular framework 102 incorporates structural tube or lattice type framing, and individual frame members 106 may be assembled from prefabricated and pre-sized frame panels 164. Frame members 106a and 106b include a series of frame mount flanges 110, by which frame members 106a and 106b may be bolted to each other or to end cars 114a and 114b via attachment plate 132. In embodiments, modular framework 102 includes a rail system 116 along its top and bottom sides for mounting accessories to modular framework 102 as well as support of the framework by end cars 114a and 114b. Individual rails mounted on frame members 106a and 106b seamlessly contact each other at frame joint 108, where frame members 106a and 106b connect. Rail system 116 allows for simplified system width adjustment via positioning end car 114b relative to modular framework 102 without the complexity of a telescoping frame member. In preferred embodiments, rail system 116 is a T-rail system along which end cars 114a and 114b are configured to laterally slide. Rail system 116 may also incorporate alternative rail/slot designs or guide systems. Additional frame members 106 may be added to, or removed from, modular framework 102 without the detachment of walking end car 114b. System 100 may also include a gasoline engine, diesel engine, or other like engine console 104 bolted to the frame insert 106a directly connected to drive end car 114a. System 100 may similarly include a cure tank or other accessory pod 112 bolted to the frame insert 106b directly connected to walking end car 114b. When not bolted to frame insert 106b, accessory pod 112 can further slide along rail system 116 for repositioning. In embodiments, accessory mount 136 may be connected to the underside of modular framework 102. Accessory mount 136 may, for example, accommodate a texture rake 134 for transverse or longitudinal tining operations, a spray bar assembly 152 for use in conjunction with cure tank 112, or other like functional accessories.

Figure 2:
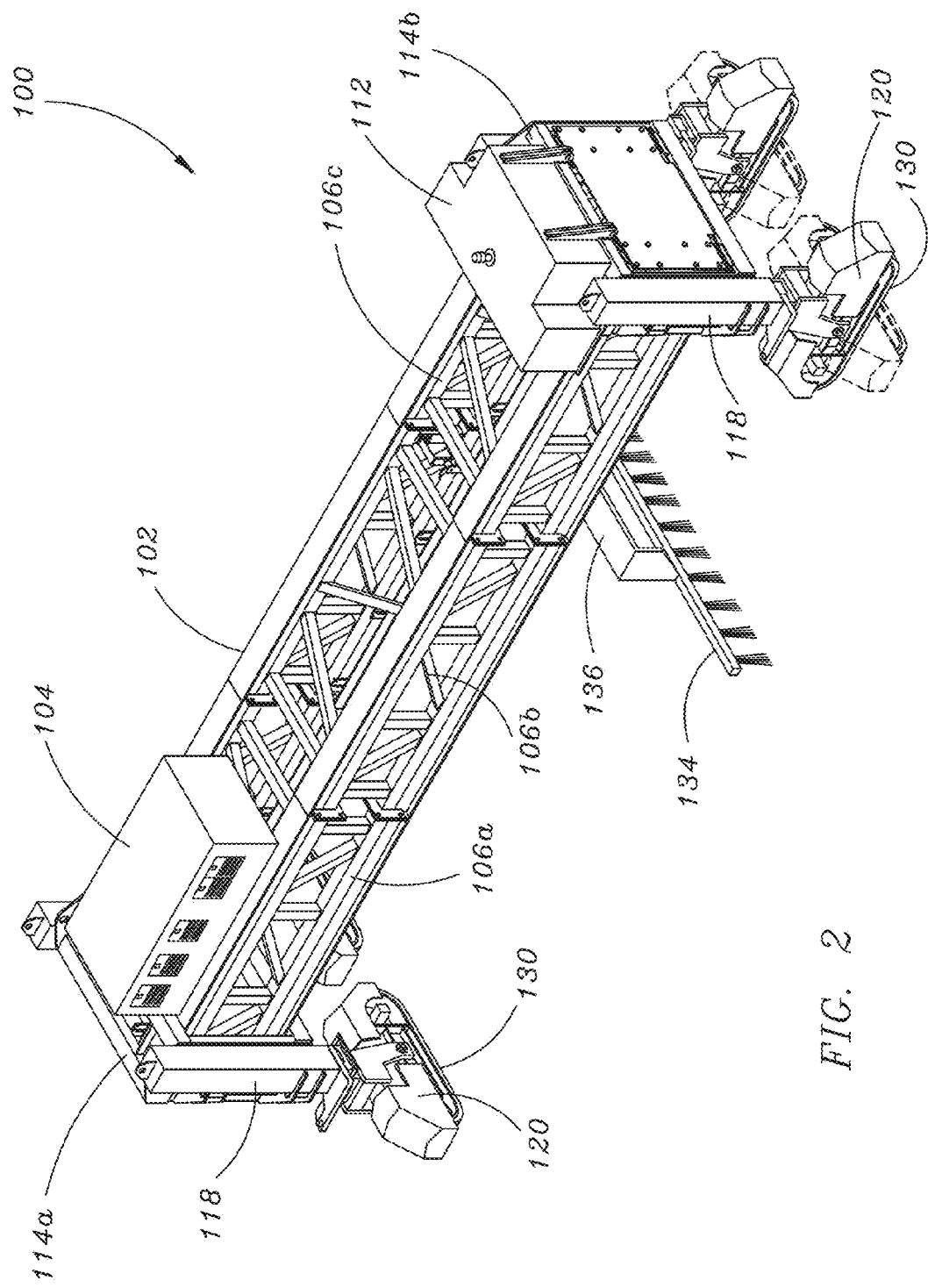
FIG. 2 is a perspective view of an embodiment of the four-track paving operations system extended by the addition of a frame member.

Referring to FIG. 2, drive end car 114a and walking end car 114b further include front and rear legs 118 at each end of system 100 for vertical support. Each leg 118 is equipped with a steerable crawler 120 (including track 130, fender, drive, and drive assembly). In some embodiments, front and rear legs 118 may be configured to hydraulically raise or lower modular framework 102 above ground level. In preferred embodiments, engine console 104 is bolted to the frame member 106a directly connected to drive end car 114a, and accessory pod 112 is bolted to the frame member 106c directly connected to walking end car 114b. Modular framework 102 may include an additional frame member 106b as a result of an operation to extend the width of system 100 and an accessory mount 136 to which texture rake 134 has been transversely mounted. Preferred embodiments of accessory mount 136 can accommodate other accessories or a longitudinally mounted texture rake 134.

Referring to FIGS. 3A and 3B, embodiments of paving operations system 100 may be transitioned into several useful configurations. FIG. 3A illustrates an embodiment of system 100 in an operational/paving configuration. Front steerable crawlers 120 mounted to adjustable legs 118 may be rotated by track mount yokes 126 to an operating orientation both substantially perpendicular to modular framework 102 and substantially parallel to a working surface. Tracks 130 of steerable crawlers 120 contact the ground as system 100 travels along the working surface while a control system electronically maintains the perpendicularity of system 100 to the working surface. In preferred embodiments, operator console 140 may be secured to modular framework 102 to provide the operator of system 100 with a means of interfacing with and directing the control system of system 100. In preferred embodiments, the control system of system 100 may include the control system substantially disclosed in provisional application 61/760,416, herein incorporated in its entirety, or any like combination of hardware and software for controlling the components of system 100. Referring to FIG. 3B, in embodiments of system 100 both front and rear steerable crawlers 120 connected to walking end car 114b may be configured to steer in unison or individually to maintain system 100 in an orientation substantially parallel to the direction of travel along a work surface.

In preferred embodiments, the control system of system 100 includes a tining control system. Embodiments of the tining control system may include acoustic or sonic sensors to track slab elevation so that a texture rake 134 mounted transversely may trace a work surface at a desired depth without the need for a power transition adjuster. The control system of system 100 can control the depth of texture rake 134 through a hydraulic height adjuster of the accessory mount 136. In preferred embodiments, the hydraulic height adjuster can move the texture rake through a vertical range of 12 to 16 inches in response to information received through sensors or user input. The tining control system may also include proximity switches to control the end points of texture rake 134. Embodiments of the tining control system can also include centrally mounted acoustic or sonic sensors for monitoring grade elevation. Grade elevation sensors enable the control system to control the height and orientation of a longitudinally mounted texture rake 134 during pavement tining or crowning operations. Embodiments of the control system may also include a grade control system, a trimming control system, a smoothness indicator control system, or any other control system component configured to control an accessory of system 100.

Figure 4A:
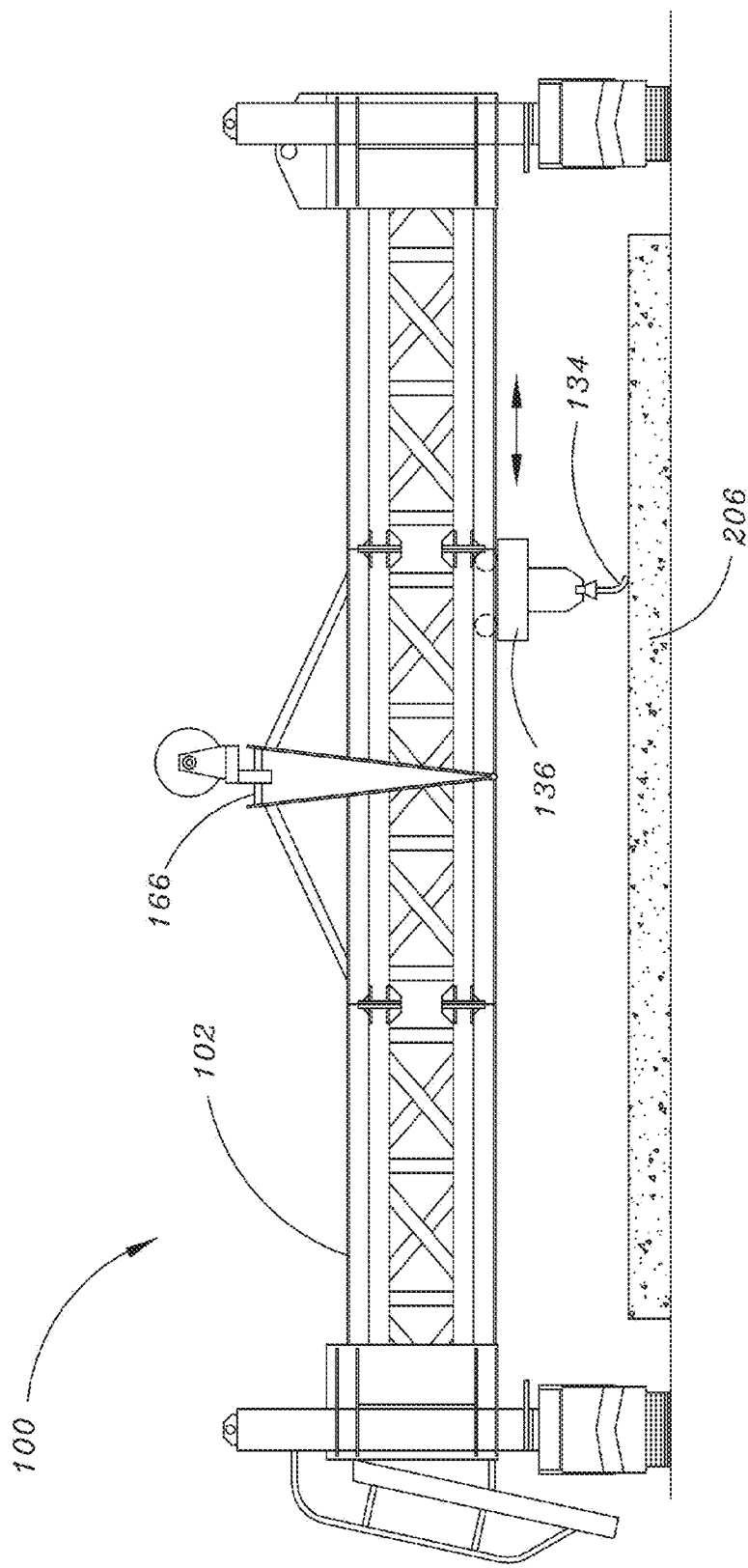
FIG. 4A is a front elevational view of a prior art texturing accessory.
Figure 4B:
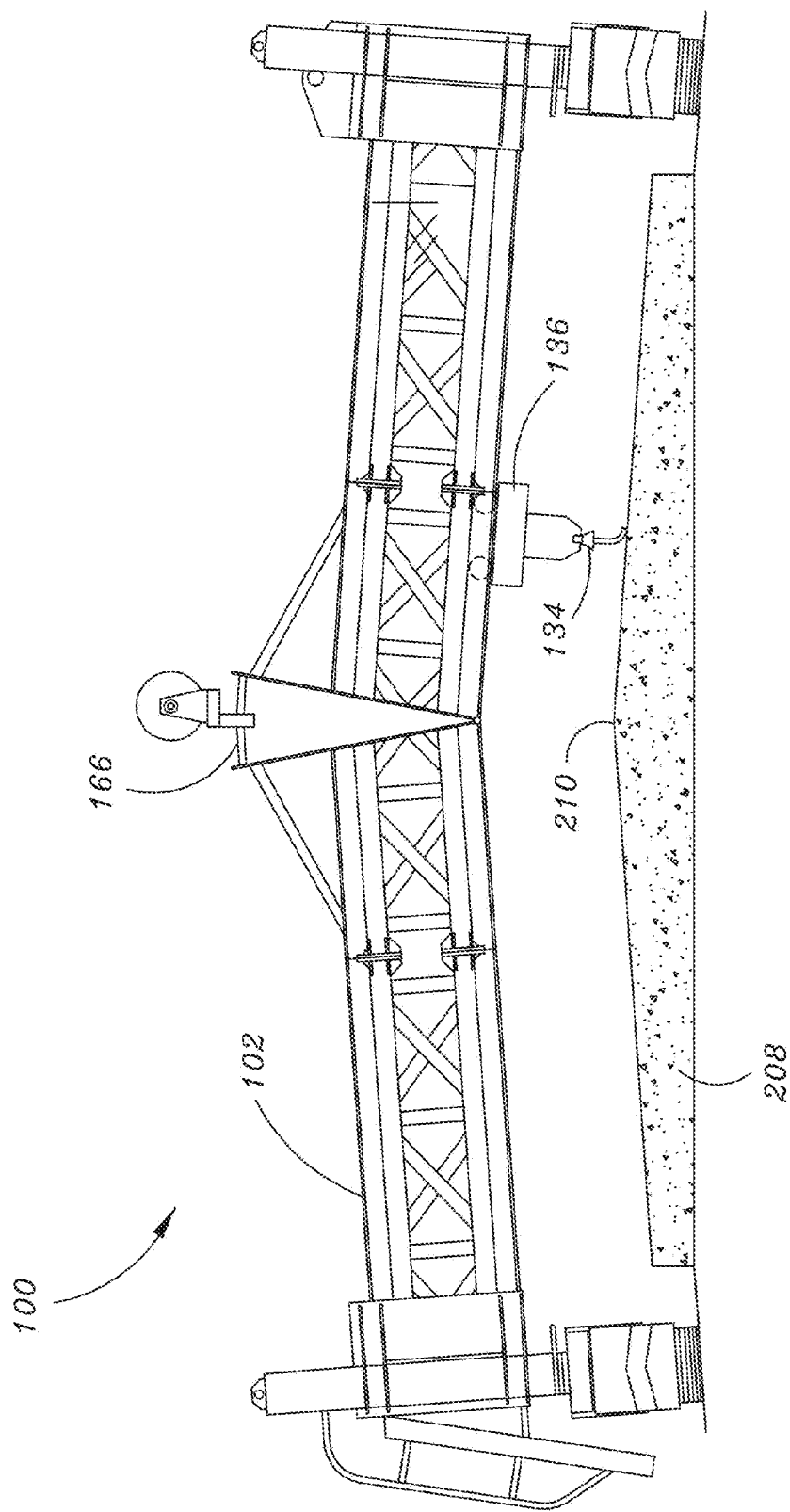
FIG. 4B is a front elevational view of a prior art texturing accessory.

FIGS. 4A-4D illustrate an alternative embodiment of a texturing attachment for a paving operations system 100 of the present invention. Referring to FIG. 4A, system 100 may be fitted with an accessory mount 136 to which a texture rake 134 may be mounted for transverse texturing of a flat surface 206. The control system of system 100 may direct texture rake 134 to move transversely across surface 206, texturing the surface to a desired depth. Referring to FIG. 4B, system 100 may be configured to texture a crowned surface 208. Paved surface 208 may be crowned, i.e., descend in height from a central apex 210, so that water may flow downward away from the apex 210 and efficiently drain surface 208. Power transition adjuster 166 may therefore be mounted to system 100 and configured to crown the modular framework 102 of system 100 to match crowned surface 208, so that texture rake 134 connected to accessory mount 136 may transversely move across and texture surface 208 to a uniform desired depth.

Figure 4C:
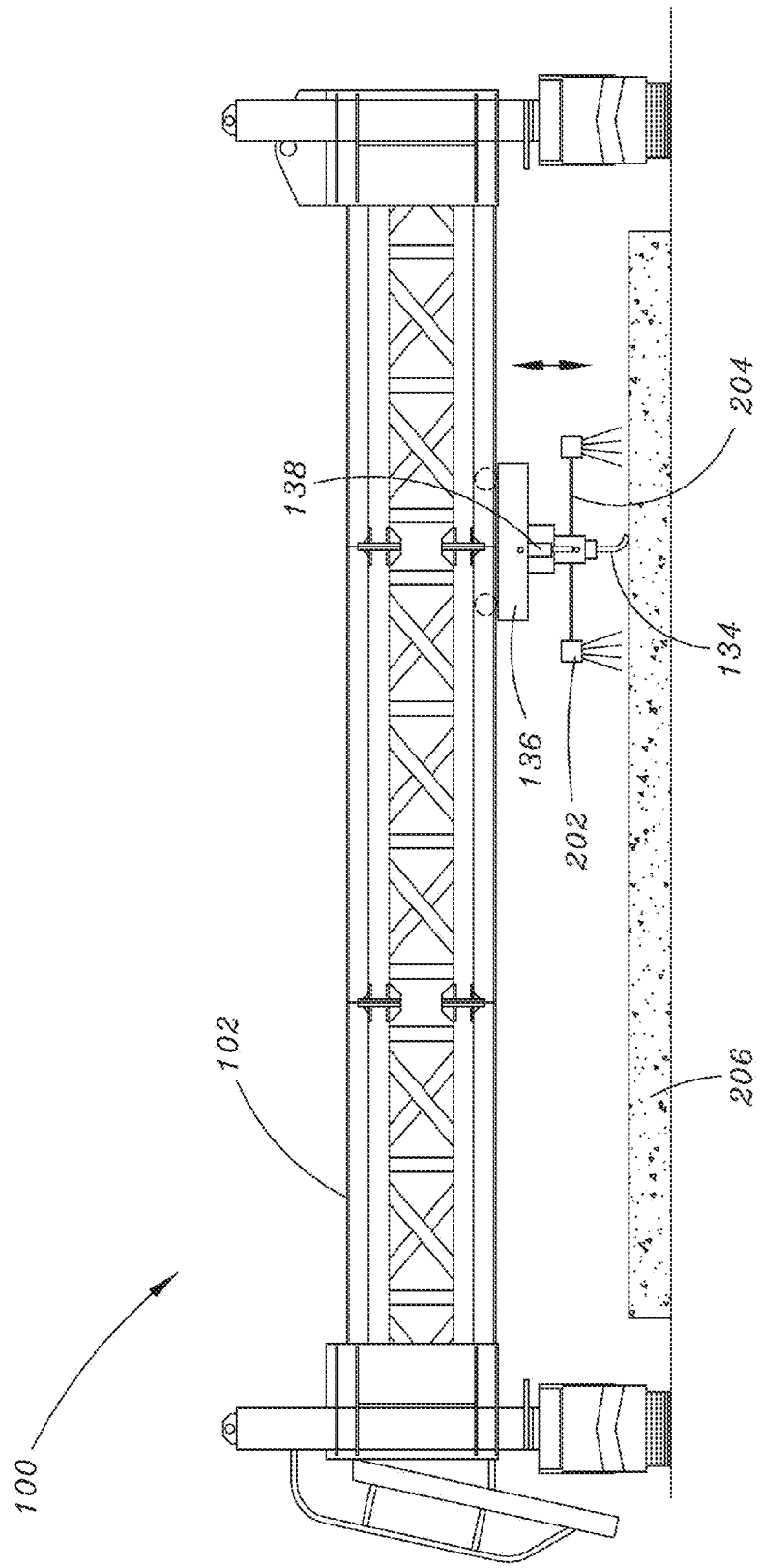
FIG. 4C is a front elevational view of an alternative embodiment of a texturing attachment of the present invention.
Figure 4D:
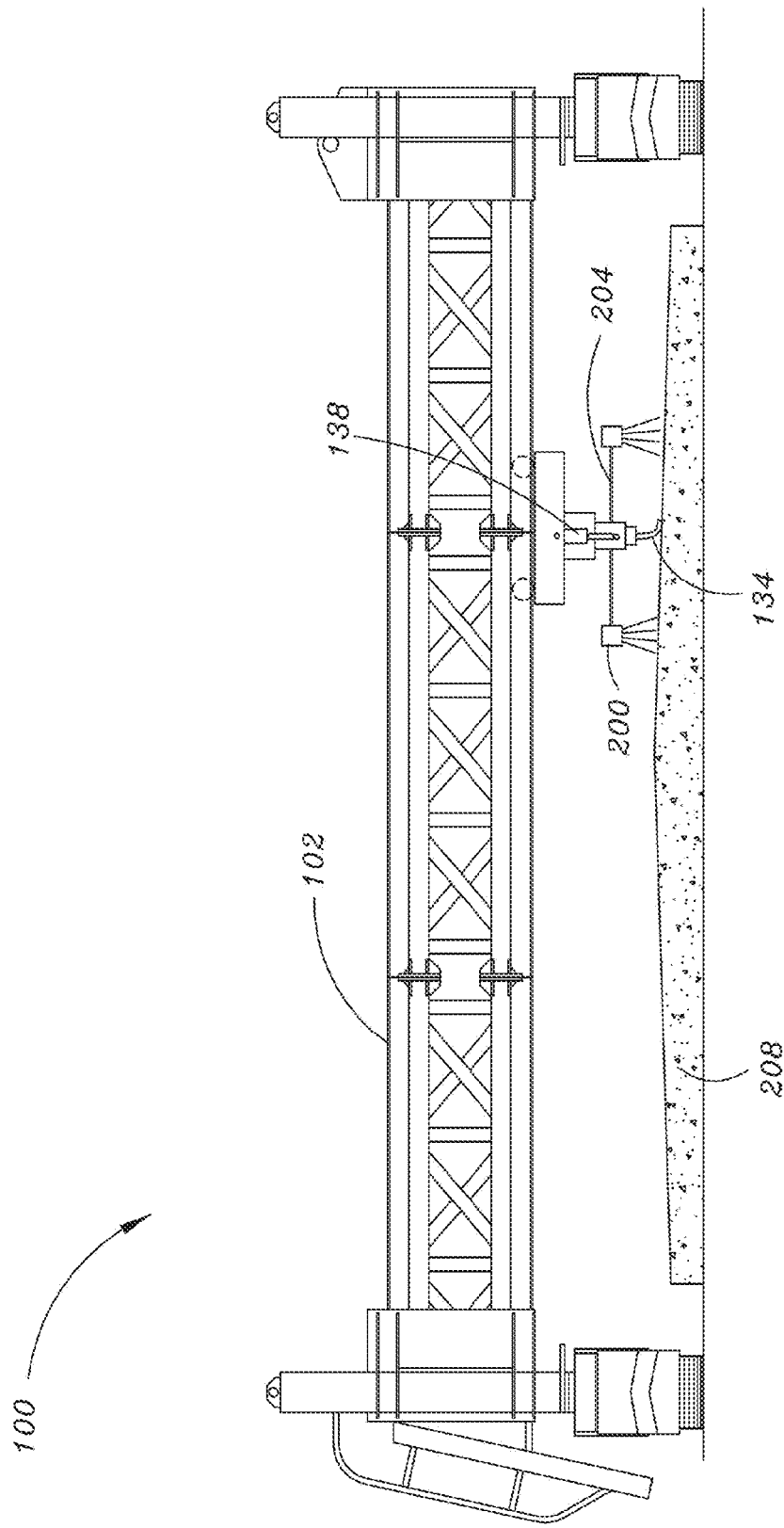
FIG. 4D is a front elevational view of an alternative embodiment of a texturing attachment of the present invention.

FIG. 4C illustrates an alternative embodiment of paving operations system 100. In preferred embodiments, system 100 may include a hydraulic height adjuster 138 and sensor array 204 mounted to accessory mount 136. Sensor array 204 may include at least one slab elevation sensor 202 transversely mounted to texture rake 134 and configured to return data on the elevation of flat surface 206 to the control system. FIG. 4D illustrates an alternative embodiment of paving operations system 100 texturing a crowned surface 208. Rather than utilize a power transition adjuster, system 100 may reduce complexity by mounting hydraulic height adjuster 138 and sensor array 204 to accessory mount 136 in addition to texture rake 134. As accessory mount proceeds transversely across crowned surface 208, transversely mounted slab elevation sensors 200 provide data to the control system which in turn controls hydraulic height adjuster 138. In preferred embodiments, hydraulic height adjuster 138 can raise or lower accessory mount 136 (and texture rake 134) through a continuous vertical range of 12 to 16 inches, allowing texture rake 134 to transversely texture crowned surface 208 at a uniform or desired depth.

Figure 5A:
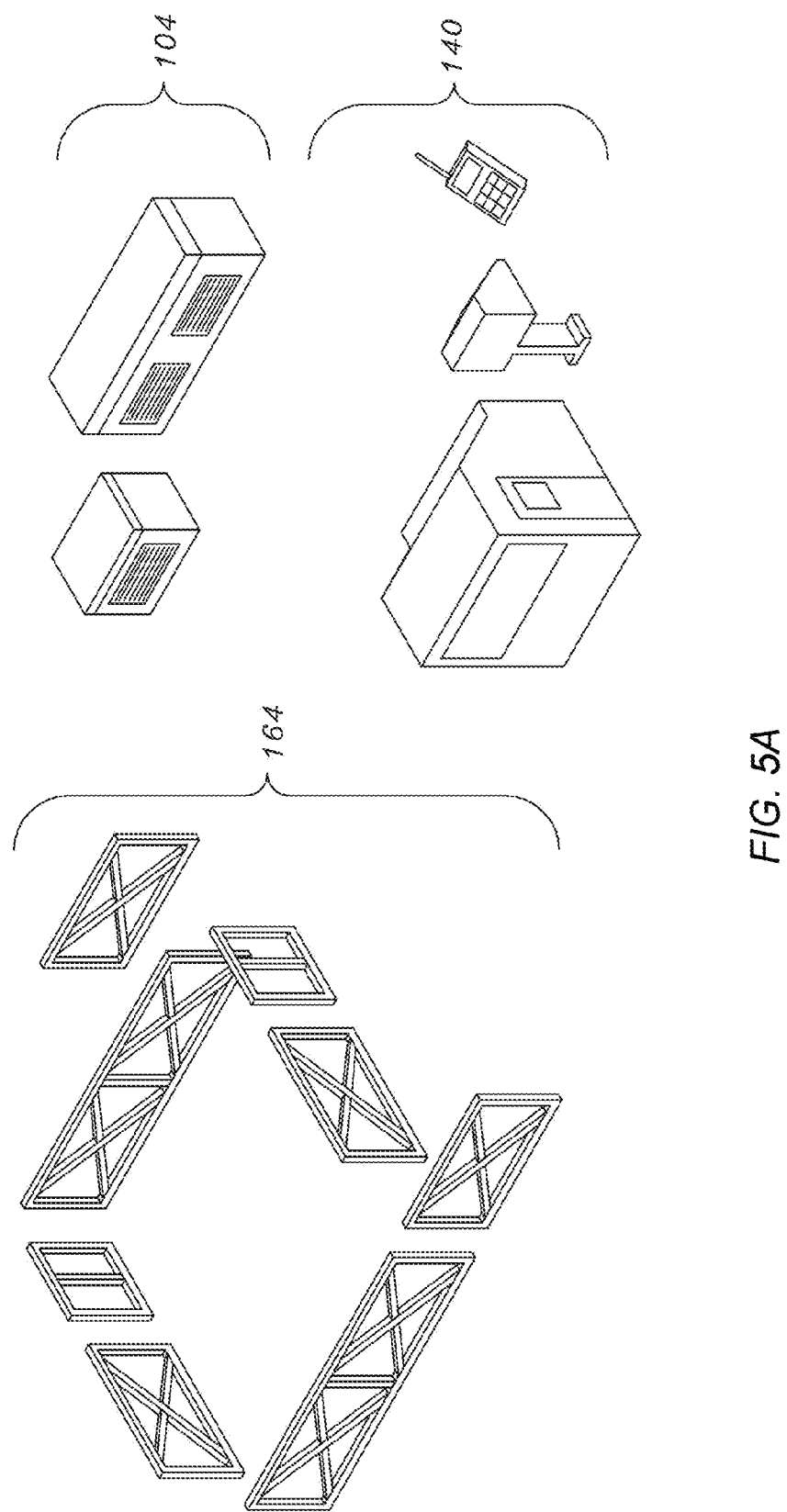
FIG. 5A is a diagrammatic perspective view of the components and accessories of an embodiment of a paving operations system of the present invention.

FIGS. 5A, 5B, 5C, and 5D illustrate modular components and accessories 170 of an embodiment of paving operations system 100. In some embodiments, paving operations system 100 may be modularly manufactured or modularly configured in the field from a selection of prefabricated components to maximize the versatility and functionality of a single base apparatus. Referring to FIG. 5A, accessories 170 may include individual frame panels 164 (from which frame members 106 may be assembled) of various lengths and levels of interior support. Engine consoles 104 may include gasoline, diesel, or electric power sources of various sizes and power ratings. Operator consoles 140 may include standard control stations, portable control consoles mountable to any part of the modular framework, and remote control units.

Figure 5B:
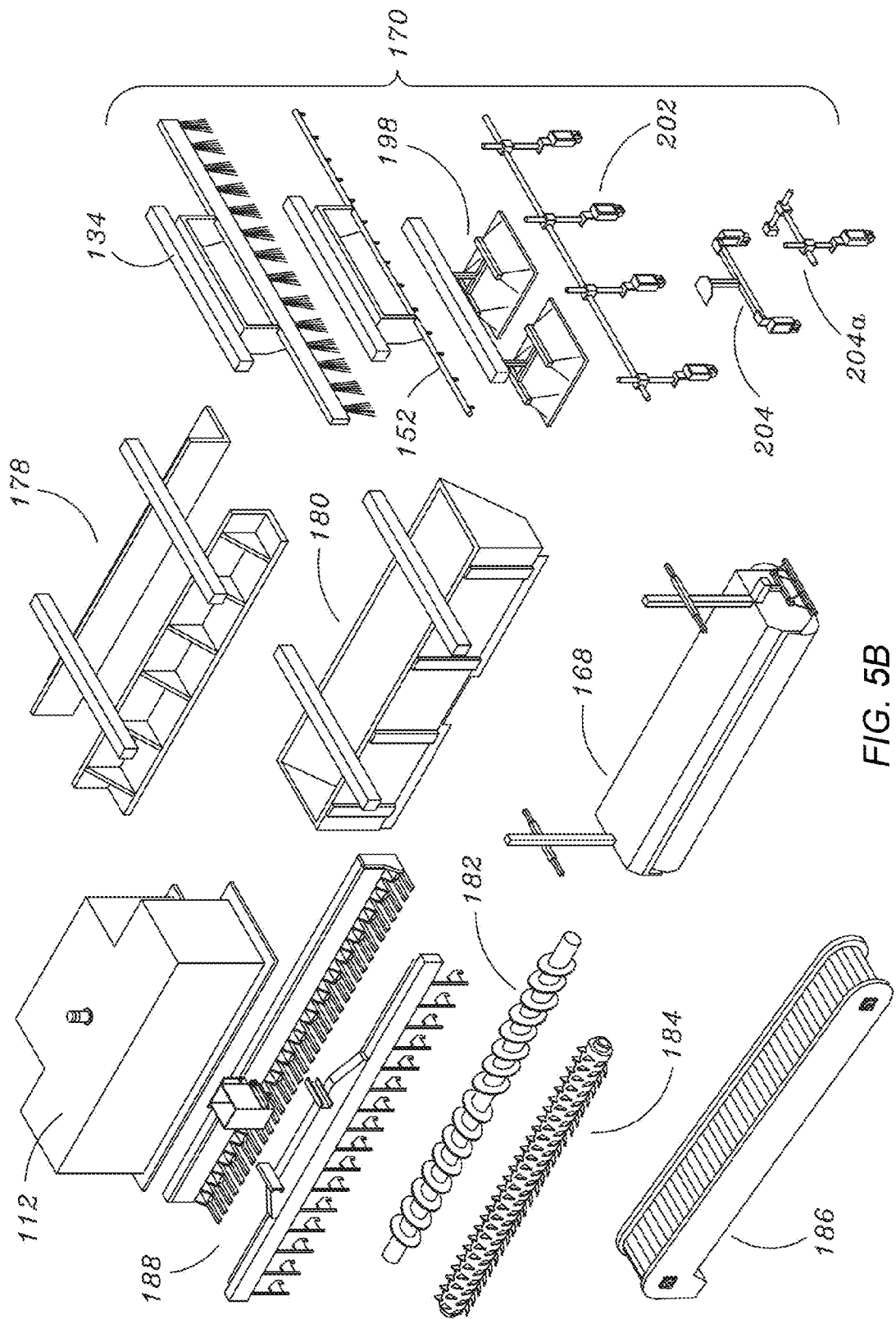
FIG. 5B is a diagrammatic perspective view of the components and accessories of an embodiment of a paving operations system of the present invention.

Referring to FIG. 5B, accessories 170 attachable to accessory mount 136 or modular framework 102 may include accessory pod/cure tank 112, longitudinal or transverse texture rakes 134, spray bar assemblies 152, slipformers 178, transverse saw/bridge deck finishers 168, paving pans 180, spreading augers 182, trimmer wheels 184, placer conveyors 186, dowel bar inserters 188, finishing pans 198, individual sensors 202, or arrays 204 of multiple sensors. Sensor arrays 204 may be mounted transversely (for slab elevation tracking in crowning operations) or longitudinally (for grade elevation). Sensor arrays may further include single adjustable spot sensors 204a mounted to the undercarriage or to another accessory. Individual sensors 202 may be mounted to another accessory or to system 100 in order to return data associated with a geographic reference of system 100, a position relative to system 100, the position of a particular tool or accessory, a work surface position, or a work file position.

Figure 5C:
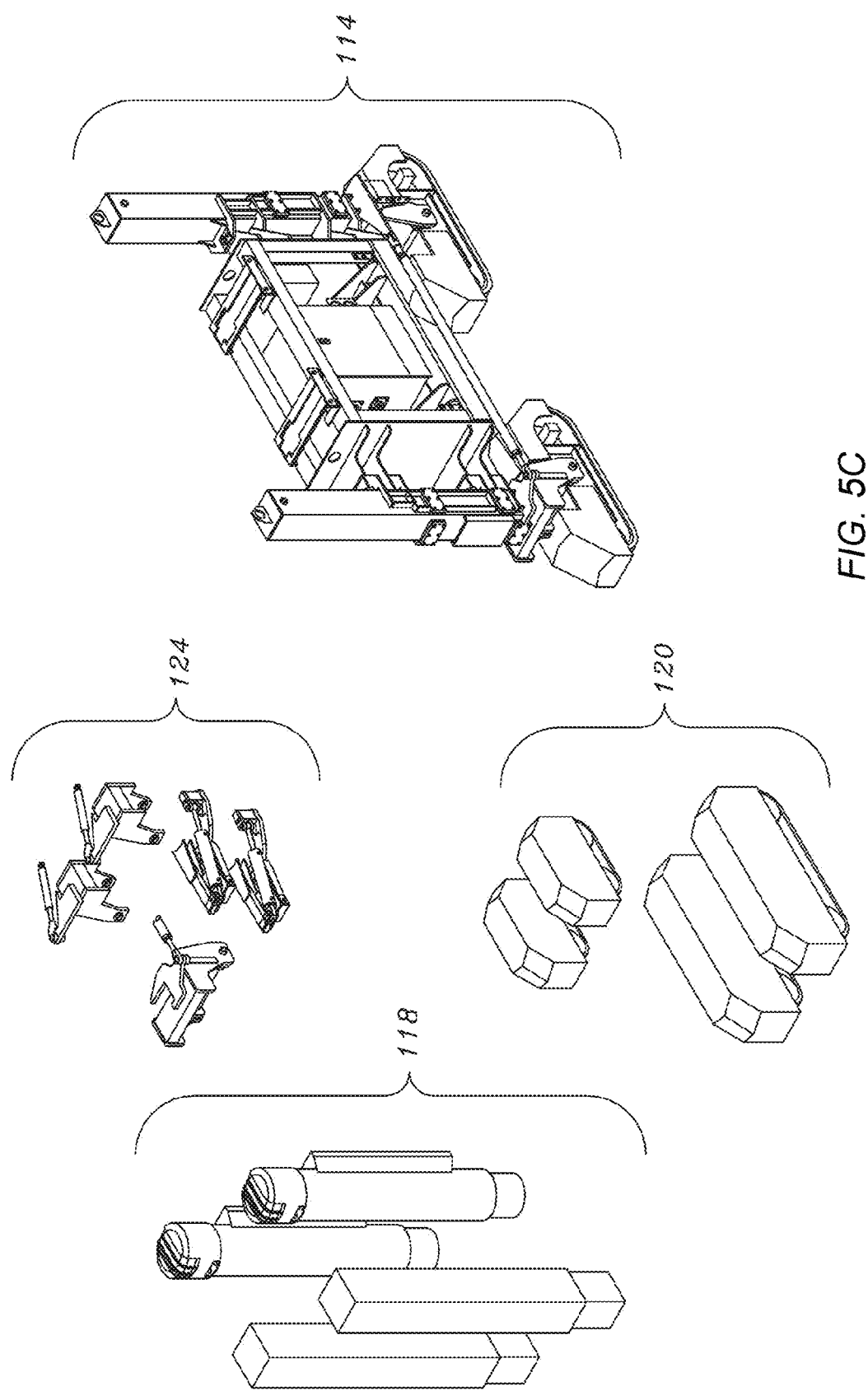
FIG. 5C is a diagrammatic perspective view of the components and accessories of an embodiment of a paving operations system of the present invention.

Referring to FIG. 5C, steerable crawlers 120 may include tracks 130 of various sizes. Steering assemblies 124 may include single-cylinder, multiple-cylinder, and smart-cylinder leg pivots and assemblies, yoke/pin assemblies, and combinations of steering cylinders and tie rods. Adjustable legs 118 may include legs capable of raising and lowering the vertical height of modular framework 102 via hydraulic, electronic, and other means. End cars 114 may include combinations of end frame structures, adjustable legs 118, steerable crawlers 120, and steering assemblies 124.

Figure 5D:
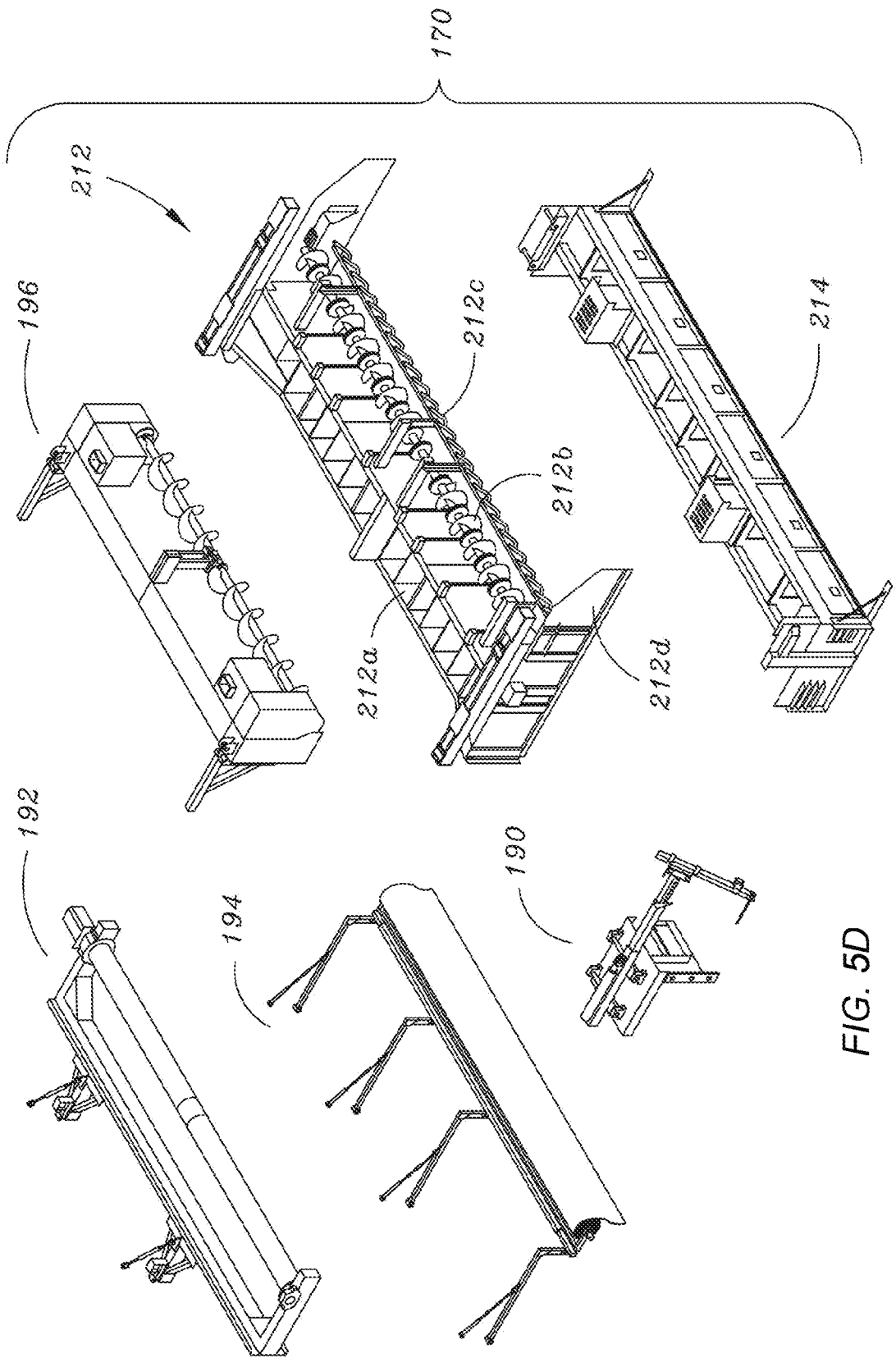
FIG. 5D is a diagrammatic perspective view of the components and accessories of an embodiment of a paving operations system of the present invention.

Referring to FIG. 5D, further accessories attachable to accessory mount 136 or otherwise configurable to paving operations system 100 may include side bar inserters 190, poly rollers 192, burlap drags 194, auger strike-offs 196, auger strike-off assemblies 212 (incorporating slipformers 212a, spreader 212b, vibrating rods 212c, and sideforms 212d), and IDBI screeds 214.

Those having skill in the art will appreciate that there are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "connected", or "coupled", to each other to achieve the desired functionality, and any two components capable of being so associated may also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

We claim:

1. An accessory control system for a paving machine, comprising:
   at least one undercarriage configured for slidably mounting to a paving machine and for traversing a transverse axis of the paving machine;
   at least one accessory removably mounted to the undercarriage;
   at least one sensor removably mounted to the undercarriage and configured to determine a position of the at least one accessory;
   the at least one undercarriage including a height adjuster configured to transport the at least one undercarriage through a vertical range based on a position determined by the at least one sensor.

2. The accessory control system of claim 1, wherein the height adjuster is at least one of a hydraulic actuator and an electro-hydraulic actuator.

3. The accessory control system of claim 1, wherein the at least one undercarriage is configured for mounting to a modular framework of the paving machine.

4. The accessory control system of claim 1, wherein the at least one undercarriage is configured for mounting to at least one of a texturing machine or a curing machine.

5. The accessory control system of claim 1, wherein the at least one sensor includes a sensor configured to determine an elevation of at least one working surface.

6. The accessory control system of claim 1, wherein the at least one sensor includes a proximity switch configured to determine a proximity of the at least one accessory to an end of the transverse axis.

7. The accessory control system of claim 1, wherein the at least one accessory includes at least one of a texture rake, a texture broom, a texture drag, a spray bar assembly, a roller, an auger, a spreader, a trimmer, a form, a mold, a pan, a finisher, a saw, a bar inserter, a screed, a placer, a conveyor, and a plow.

8. The accessory control system of claim 1, wherein the at least one sensor includes at least one of a sonic sensor and an acoustic sensor.

9. The accessory control system of claim 1, wherein the at least one accessory is at least one of longitudinally mounted and transversely mounted.

10. A method of transversely texturing a paved surface having an apex, a first lateral edge and a second lateral edge, the method comprising:
    mounting an undercarriage including a height adjuster to a paving operations machine;
    mounting at least one texturing accessory to the undercarriage;
    mounting at least one sensor to at least one of the at least one texturing accessory and the undercarriage;
    positioning the at least one texturing accessory at the first lateral edge of the paved surface and at a first depth relative to the paved surface;
    directing the at least one texturing accessory transversely across the paved surface from the first lateral edge to the second lateral edge; and
    maintaining the first depth between the at least one texturing accessory and the paved surface by adjusting the elevation of the at least one texturing accessory through a vertical range.

11. The method of claim 10, wherein the height adjuster includes at least one of a hydraulic actuator and an electro-hydraulic actuator.

12. The method of claim 10, wherein the at least one texturing accessory includes at least one of a tining broom, a texture broom, and a texture rake.

13. The method of claim 10, wherein the at least one sensor includes at least one of a sonic sensor and an acoustic sensor.

14. The method of claim 13, wherein the at least one sensor includes at least one sonic sensor mounted transversely to the at least one texturing accessory and configured to determine the elevation of the paved surface.

15. The method of claim 10, wherein the first depth represents at least one of a predetermined height of the at least one texturing accessory above the paved surface and a predetermined depth of the at least one texturing accessory beneath the paved surface.

16. The method of claim 10, wherein the maintaining the first depth between the at least one texturing accessory and the paved surface by adjusting the elevation of the at least one texturing accessory through a vertical range includes
    while the at least one texturing accessory is between the first lateral edge and the apex of the paved surface, maintaining the first depth between the at least one texturing accessory and the paved surface by raising the at least one texturing accessory via the height adjuster; and
    while the at least one texturing accessory is between the apex and the second lateral edge of the paved surface, maintaining the first depth between the at least one texturing accessory and the paved surface by lowering the at least one texturing accessory via the height adjuster.

17. The method of claim 10, wherein the paving operations machine includes at least one of a paving machine, a texturing machine, and a curing machine.

* * * * *